UNITED STATES PATENT OFFICE 2,512,709

CHLORAL-DIHYDRIC PHENOL POLYMERS

Harold C. Beachell, Wilmington, Del., assignor to E. I. du Pont de Nemours & Company, Wilmington, Del., a corporation of Delaware No Drawing. Application November 24, 1947, Serial No. 787,851

6 Claims. (Cl. 260—54)

This invention relates to interpolymerization products of chloral with 1,3-dihydric phenols, to processes for preparing them, and to tanning processes in which they are used.

The conversion of skins into leather is accompanied by profound changes in their physical characteristics. They become opaque, and a distinct fibrous structure becomes apparent. The stiffness characteristic of dry rawhides disappears to a great extent and they become comparatively flexible. They assume a characteristic attractive appearance and soft "feel." Tanning also renders the product imputrescible. For useful tanning these changes must be relatively permanent, and the leather should be resistant to detanning by water, at least at ordinary temperatures.

The ancient and well-developed art of tanning customarily effects the conversion of skins into leather by the use of vegetable preparations that contain tannins. Vegetable tanning materials, such as quebracho extract, produce leather which is only moderately resistant to detanning by water and the leather is particularly unstable when the temperature of the water exceeds about 180° F.

Tanning processes employing metal compounds, such as chromium sulfate, are also known. Such processes are, however, subject to a number of disadvantages in operation, and the leather produced is characteristically colored. While processes using metal compounds have been accepted for certain uses, they are by no means equivalent to vegetable tannages, and vegetable tannages have continued to be used despite their slowness and other disadvantages because of the quality and characteristics of the leather produced.

Numerous synthetic tanning materials have been proposed, but most of these are markedly inferior to the vegetable or metal compound tanning agents mentioned.

It is an object of this invention to provide novel polymers. It is a further object to provide polymers which are particularly useful in tanning. It is a still further object to provide tanning compositions which are comparatively inexpensive and which are quite effective. It is a still further object to provide tanning processes which are rapid, simple to use, and easily controlled. Still further objects will become apparent hereinafter.

The foregoing and other objects of this invention are attained by the preparation of a polymer of chloral with a 1,3-dihydric phenol and by the use of such a polymer in tanning compositions and processes.

Leather produced using the polymers of the invention is notable because of its high shrinkage temperature which is indicative of stability of the tannage. The leather is stable at higher pH than leather tanned with vegetable tanning agents.

Simple addition products of chloral with 1,3-dihydric phenols may easily be prepared by mixing chloral and resorcinol in the ratio of about one-half mol, or less, of chloral for each mol of resorcinol in an aqueous system. The addition product will separate as a yellow crystalline material. This product has little or no effect as a tanning agent. Its molecules appear to be made up of a reaction product of two mols of resorcinol with one mol of chloral.

The novel products of the invention are polymers of chloral and resorcinol. The polymers have more than 4 benzene rings and preferably from about 6 to 12 benzene rings, both inclusive.

The tanning agents of the invention are moderately water-soluble, especially in slightly alkaline solutions and are precipitated by acids. The products vary in color from brown to red, depending upon pH.

In referring to the products as polymers of chloral with resorcinol, it will be understood that the polymerization probably proceeds by the chloral first reacting with the resorcinol and the condensation product thus formed reacts either with similar units or with further quantities of chloral and resorcinol. A similar reaction occurs with chloral and other dihydric phenols.

The product strangely contains very little chlorine and it appears that the chlorine is hydrolyzed off during the polymerization. The polymer, accordingly, is composed largely of recurring units of the following type:

(1)

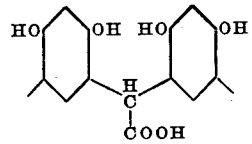

In some instances, particularly when the solution is neutralized with alkali, some of the —CCl₃ groups are hydrolyzed off with the formation of chloroform and with the result that there may be some units of the following character:

(2)

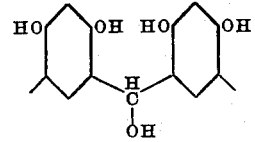

Thus the products of the invention are polymeric and are characterized by the presence of two phenolic groups for each benzene ring and approximately one carbonyl group for each benzene ring. It will be apparent that there will be somewhat less than one carbonyl group for each ring and that the discrepancy will diminish as the number of rings increases. The product may also contain, as above indicated, some hydroxyl groups linked to the aliphatic carbon which joins the benzene rings.

If instead of resorcinol, which discussed above as illustrative, there is used another dihydric phenol, then the polymer will similarly contain substantially the recurring structures shown above but the location of the hydrolxyls on the benzene rings will be somewhat different. Additional groups which are present in the phenols will, of course, also be present in the polymer.

The polymerization of chloral with a phenol, according to the invention, may be carried out in any of the ways generally well known to the art for effecting polymerization. The principal consideration in the selection of conditions for processes of the invention is to impose severe enough conditions to effect the extent of polymerization desired. It is also to be observed that the conditions must not be so severe as to result in extremely high molecular weight polymers which would be entirely insoluble and hence unsatisfactory for tanning.

The polymerization may most readily be effected in aqueous solution, tho organic solvents which do not react with either the chloral or phenol may be employed.

A catalyst, such as a few drops of hydrochloric acid or another acid, may be included if desired. The addition of catalyst is not necessary because hydrochloric acid forms during the polymerization and serves to catalyze the reaction.

If the reaction is conducted in aqueous solution the reactants are heated under reflux for a suitable period of time, say approximately one hour or a little more, and the product can then be separated from the water in any desired way, or the aqueous solution can be used as such.

The term "water-soluble" is, standing alone, a little vague since many so-called insoluble materials are in fact soluble, at least to a certain extent. When the expression "water-soluble" is used herein it is intended to mean that the products are soluble in water to be usable as such in aqueous solutions and the solubility is, therefore, substantial. Generally it may be said that products can be designated water-soluble for the purpose of the present invention if, at 20° C., they are soluble to the extent of 10 grams per liter in water or slightly alkaline solutions of, say, pH 7.5.

The ration of chloral to phenol is an important consideration in the preparation of polymers of the invention. If too small an amount of chloral is used then a polymer is not obtained. In an excess of chloral is used over about one mol for each mol of phenol then the excess chloral remains unreacted and may be converted to chloroform when the solution is neutralized with alkali and is wasted. Generally, a mol ratio of chloral to resorcinal from about .75:1 to 1.25:1 can be used. More specifically, it is desired to use a ratio of about 1:1 or a little less than 1:1.

1,3-dihydric phenols, suitable for use in making polymers of the invention, are characterized by containing at least 2 hydrogen atoms para to phenolic hydroxyls.

The following are examples of suitable phenols for use in the preparation of interpolymers according to the invention:

1. Resorcinol

2. Phloroguclnol

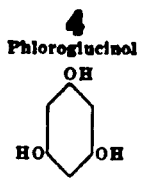

3. Alpha resorcylic acid (3,5-dihydroxybenzoic acid)

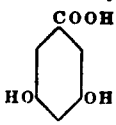

Gamma resorcylic acid (2,6-dihydroxybenzoic acid)

4.

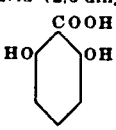

5. Resorcinol aldehyde (2,6-dihydroxybenzaldehyde)

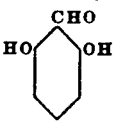

Products of the invention are useful as is more particularly set out hereinafter for the treatment of skins to produce leather. They are also useful for many other purposes and they may be employed, for instance, for hardening gelatin films and for increasing the water-insolubility of protein adhesives.

In order that the invention may be better understood reference should be had to the following illustrative examples:

Example 1

A solution of chloral and resorcinol in water was made up with the following:

Chloral (1 mol), 147.5 parts by weight.
Resorcinol (1 mol), 110 parts by weight.
Water, 256 parts by weight.

The resorcinol was first prepared as an approximately 30% solution and the chloral was added at 90° C. to the chloral solution. Twenty drops of concentrated hydrochloric acid was added as a catalyst.

After the addition of chloral was complete, the mixture was refluxed at atmospheric pressure (750 mm.) for one hour. It is important that the reaction mixture be cooled at this point in order to avoid further reaction leading to the formation of insoluble polymers.

Finally the cooled reaction mixture (30° C.) was neutralized to pH 6.5 by adding a 50% solution of sodium hydroxide with vigorous agitation.

The resulting solution contained approximately 20% of the polymer by weight and could be used as such for tanning and other purposes. If desired, the polymer can be separated in any suitable way as, for instance, by salting it out with sodium chloride.

A product was salted out after preparation, as shown in this example, and acetylated. The molecular weight of the product after acetylation was determined and was found to be 2,200. The saponification number of the acetylated product was 544, which indicated approximately 21 free hydroxyl groups per molecule. The polymer appeared to contain about 10 benzene rings. The chlorine content was 1.59% and the melting point about 185° C.

Similar polymers are prepared also using phloroglucinol and other 1,3-dihydric phenols as described above.

The polymerization products of the invention are precipitated by acids. In using such products for tanning it is possible to use substantially neutral conditions or slightly acidic conditions. Slightly alkaline conditions may be used but tanners do not prefer alkaline conditions.

The polymerization products above described may be used for the treatment of any type of skin adapted to be converted into leather or fur. It is to be observed that the term "skin" is used generically to include heavy skins such as cowhide, lighter skins such as goatskin and calfskin, and also skins of fur-bearing animals. It will naturally be necessary to adapt the processes to the type of skin to be treated. Those skilled in the art are well aware of such factors and may readily adapt the tanning agents of this invention to the needs of the particular tanning problem.

Skins to be tanned according to the processes of this invention may be prepared in any of the manners customary in the art, particularly for the preparation of skins for vegetable tanning, they may be unhaired, limed, delimed, and bated. The skins, if pickled, should be depickled before tanning for, as will be mentioned hereinafter, it is preferred to effect tanning under substantially neutral conditions. The skins may be given a salt-liquor treatment to soften them up and to render them of a more uniform condition as is the practice in the art.

While skins prepared in any manner may be treated according to the processes of this invention, it will ordinarily be desired that the skins be at a pH near 7, or slightly on the acid side. The tanning operation is conducted at about pH 6.5 to 7.5 and while the tanning solution may suitably be controlled to compensate for variance of the pH of skins, it will often be found advantageous to bring the skins to a suitable pH prior to introducing them into the tanning solution. Generally, it may be indicated that the tanning operation with the agents of the invention is conducted beginning at a pH of 6.5 to 7.5. The tanning is then finished off at a slightly lower pH ending up with a pH from about 4 to 6.

The unneutralized reaction products as prepared in Example 1 will ordinarily be found to be somewhat more acidic than is desired for a tanning bath, and, of course, as has been indicated above, the pH may suitably be adjusted by the use of such alkalies as alkali metal hydroxides or carbonates, or by the use of ammonium hydroxide. If it is desired to lower the pH of the tanning solution there may be used any acidic material, such as lactic, hydrochloric, sulfuric, acetic, phosphoric, sulfamic, or formic acids.

Tanning processes, according to the present invention, are closely related to the vegetable tanning processes heretofore used and the close kinship between the processes makes it unnecessary to enter into great detail regarding tanning technique since those skilled in the art may use the tanning agents of the present invention in accordance with the practices already common in the art for vegetable tanning.

While the agents of the present invention may be used alone for tanning with excellent results, they may, if desired, be used together with any other tanning agent or tanning assistant known to the art. Again, in accordance with practices already well known, they may be used prior to or following other tannages. They may be used, for instance, in conjunction with vegetable tanning materials such as quebracho extract, with chrome tans, with synthetic tanning agents containing sulfonic acid groups, or with formaldehyde. They may also be used in conjunction with the tanning agents shown in the Graves Patents 2,205,882 and 2,205,883.

The hides following treatment with a tannage of the present invention may be further treated with a soluble salt of aluminum, iron, titanium, copper, or chromium as in the Kirk Patent 2,205,901.

Leather produced according to the processes of this invention may be subjected to any of various kinds of finishing treatments customarily used. The leather, if desired, may be suitably filled or given any of the numerous surface treatments customary in the art.

*Example 2*

61.4 parts by weight of a 28.8% aqueous solution of chloral-resorcinol polymer prepared, as in Example 1, was diluted with water to make a tanning bath totalling 177 parts by weight and having a pH of 6.6.

To this solution was added 88.5 parts by weight of pickled calfskin which had been de-pickled in a solution containing 150 parts water, 10 parts sodium acetate, 3 parts sodium chloride, agitated one hour and rinsed in cold water. The tanning solution and de-pickled skin were agitated mildly for a period of 26 hours. At the end of this time the skins were completely penetrated and dried cutting indicated solid leather.

The tanning solution had remained at approximately pH 6.6 and was adjusted by increments to pH 4.5 with 10% lactic acid solution, with continued agitation, the adjustment requiring continued agitation for 5 more hours.

The leather was removed, washed in water at approximately 90° F., wrung thoroughly, oiled on the grain with neat's-foot oil, and hung to dry.

The resulting leather was full, solid, and of a pleasing yellow color. It had a shrink temperature of 198° F.

*Example 3*

110 parts by weight of resorcinol (1 mol) was dissolved in 250 parts by weight of 20% aqueous hydrochloric acid solution. This mixture was placed in a corrosion-resistant reaction vessel fitted with a reflux condenser and heated to the boiling point of the mixture (about 105° C.). In a separate vessel, there was prepared an aqueous solution of chloral consisting of 147.5 parts by weight of chloral and 430 parts by weight of water. One-quarter of the latter aqueous chloral solution was added to the refluxing acidic resorcinol solution, whereupon vigorous reaction occurs, as evidenced by more rapid boiling of the solution. After the reaction subsided, or after 20 minutes, a second quarter of the aqueous chloral solution was added to the reactor, the temperature within the reactor at all times being maintained above 105° C. After another 20 minutes, the third quarter of the aqueous chloral solution was added and still later the last quarter. The heating was continued for about 25 minutes after the addition of all the aqueous chloral solution.

After about half of the chloral had been added, there appeared within the reaction mixture a viscous or resinous mass, which increased in quantity as the reaction proceeded. At the same time, analysis of the reaction mixture with respect to HCl, showed that practically all the chlorine originally present in the chloral was converted in the course of the reaction to HCl.

After completion of the reaction, the liquid aqueous phase was removed from the reaction vessel and approximately 170 parts by weight of water was added to the reaction vessel and the mixture brought to the boiling point. Under these conditions, the resinous mass became soft and was partially dissolved. At this point, 75 parts by weight of isopropyl alcohol was added to the aqueous suspension of resinous product, and the heating continued. Within about 30 minutes, with constant agitation, the resinous polymer was completely dissolved, and was thereupon removed from the reaction vessel. To this solution there was then added sufficient 50% sodium hydroxide solution, with good agitation, to raise the pH to about 10.0. The mixture was then heated to 100° C. and sufficient sodium hydroxide solution added during the heating to maintain the pH of the mixture above 10.0. After heating the mixture for 30 minutes under these conditions, it was cooled and the pH adjusted to 8.5 by the addition of an acid, chlorobenzenesulfonic acid. This mixture was then diluted with water to an equivalent polymer content of about 10% for the preparation of a tanning solution.

The pH of this 10% tanning solution was adjusted to about 6.5 by the addition of a small amount of acid. In a tanning drum, 100 parts by weight of drained, depickled calfskin having a pH of about 5.5 were suspended in a sufficient quantity of the above 10% tanning solution to give 20 parts by weight of polymeric tanning agent per 100 parts of drained depickled skins.

The tanning vessel was then agitated for 8 hours, after which the pH was lowered over a period of 5 hours from pH 6.0 to pH 4.5.

The leather was removed, washed in water at 90° F. wrung thoroughly, oiled on the grain with neat's-foot oil and hung to dry. The resulting leather was full, solid, and of a pleasing yellowish-brown color, and had a shrink temperature of 210° F.

This application is a continuation-in-part of my application Serial No. 707,344, filed November 1, 1946, and now abandoned.

I claim:
1. A process for the preparation of an interpolymerization product of the reactants chloral and a 1,3-dihydric phenol having at least two hydrogens para to phenolic hydroxyls comprising mixing said reactants in an inert solvent in proportions from about 0.75 to 1.25 mols of chloral for each mol of the dihydric phenol and heating at about reflux temperature for about one hour to effect polymerization to the stage where the interpolymerization product contains more than 4 but not more than 12 benzene rings supplied by the phenol.

2. A process for the preparation of an interpolymerization product of the reactants chloral and resorcinol comprising mixing said reactants in aqueous solution in proportions from about 0.75 to 1.25 mols of chloral for each mol of resorcinol and heating at about reflux temperature for about one hour to effect polymerization to the stage where the interpolymerization product contains more than 4 but not more than 12 benzene rings.

3. A process for the preparation of an interpolymerization product of the reactants chloral and resorcinol comprising making a water solution of resorcinol and adding chloral thereto, the amount of chloral added being about equal to that of the resorcinol on a molar basis, and heating at about reflux temperature for about one hour to effect polymerization to the stage where the interpolymerization product contains more than 4 but not more than 12 benzene rings.

4. An interpolymerization product of chloral and a 1,3-dihydric phenol having at least two hydrogens para to phenolic hydroxyls prepared according to the process of claim 1.

5. An interpolymerization product of chloral and resorcinol prepared according to the process of claim 2.

6. An interpolymerization product of chloral and resorcinol prepared according to the process of claim 3.

HAROLD C. BEACHELL.

REFERENCES CITED

The following references are of record in the file of this patent:

UNITED STATES PATENTS

| Number | Name | Date |
|---|---|---|
| 1,232,620 | Stiasny | July 10, 1917 |
| 1,897,773 | Somerville | Feb. 14, 1933 |
| 2,057,676 | Graves | Oct. 20, 1936 |
| 2,058,510 | Rothrock | Oct. 27, 1936 |

FOREIGN PATENTS

| Number | Country | Date |
|---|---|---|
| 282,313 | Germany | Feb. 22, 1915 |